(12) United States Patent
Johnson et al.

(10) Patent No.: US 9,793,949 B1
(45) Date of Patent: Oct. 17, 2017

(54) METHODS AND SYSTEMS FOR SECURE AND EFFICIENT FLEXIBLE FREQUENCY HOPPING ACCESS

(71) Applicant: TrellisWare Technologies, Inc., San Diego, CA (US)

(72) Inventors: Reid Johnson, San Diego, CA (US); Mark Johnson, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 0 days.

(21) Appl. No.: 15/289,014

(22) Filed: Oct. 7, 2016

(51) Int. Cl.
*H04B 1/713* (2011.01)
*H04B 1/7143* (2011.01)
*H04B 1/715* (2011.01)
*H04W 28/04* (2009.01)
*H04L 12/26* (2006.01)

(52) U.S. Cl.
CPC ............ *H04B 1/715* (2013.01); *H04L 43/087* (2013.01); *H04W 28/044* (2013.01); *H04L 43/0882* (2013.01)

(58) Field of Classification Search
CPC .................. H04B 1/7143; H04B 1/71635
See application file for complete search history.

(56) References Cited

U.S. PATENT DOCUMENTS

| 4,442,527 | A  | * | 4/1984  | Munday | H04B 1/7156 |
|---|---|---|---|---|---|
|  |  |  |  |  | 375/134 |
| 2001/0050945 | A1 | * | 12/2001 | Lindsey | H04B 1/7143 |
|  |  |  |  |  | 375/132 |
| 2010/0260232 | A1 | * | 10/2010 | Roh | H04B 1/7143 |
|  |  |  |  |  | 375/133 |

* cited by examiner

*Primary Examiner* — David S Huang
(74) *Attorney, Agent, or Firm* — Kilpatrick Townsend & Stockton LLP

(57) ABSTRACT

Secure and efficient methods and systems of providing multiple access interference constraints for frequency hopped spread spectrum communications are presented. The methods and systems leverage a cryptographic keystream generator and iterative indexing into shuffled lists to generate a constrained collision-free frequency hopping sequence. This flexible frequency hopping access (FFHA) can support varying hop frequency and bandwidth resources including secure operation for applications where the number of channels (hopping sequences) exceeds the number of hop frequency resources available.

20 Claims, 9 Drawing Sheets

METHODS AND SYSTEMS FOR SECURE AND EFFICIENT FLEXIBLE FREQUENCY HOPPING ACCESS

FIELD OF THE INVENTION

The present invention relates to the field of radio communication systems, and more specifically, to the field of frequency-hopped packet-based radio communication system protocols.

BACKGROUND

Communications utilizing frequency-hopping spread spectrum (FHSS), as shown in FIG. 1, have a number of advantages that include combating interference/jamming, operating with large near/far dynamic range typical of networked communication, and reducing transmit energy density. A common method of providing multiple access (MA) for FHSS systems is to allow nodes to transmit on different frequency hopping sequences (channels) simultaneously. For security considerations, it is ideal to make it appear that hop sequence selection is entirely random to observers that do not have access to side information (pseudorandom keystream) shared between the transmitter and intended receiver(s). Allowing two or more simultaneous transmissions to select hopping sequences at random results in collisions that can affect the reception of transmissions at the intended receivers. This is especially true in the case where the number of available hop frequencies is not very large relative to the number of channels required for the application. Even if hop sequences do not collide exactly, performance can still be impacted. For example, if at a particular hop period, a first hop sequence (channel) selects a frequency close to a frequency selected by a second hop sequence (channel), and the second sequence is received at a higher signal level by a receiver trying to receive the first sequence, then this receiver may not have the frequency selectivity required to receive the first sequence without degradation.

Previous approaches to frequency hopping access have included computing a frequency hopping sequence for a contiguous set of frequency bands based on a pseudorandom binary sequence generated by a shift register; adapting to a poor communication environment by switching the current frequency allocation to an alternate pre-defined allocation; generating a frequency hopping sequence based on random numbers generated by a linear feedback shift register (LFSR), a number of hop frequencies, and a minimum frequency separation between hops in a sequence; and generating a time varying partition of orthogonal frequency-division multiplexing (OFDM) subcarriers to users based on outputs of an Advanced Encryption Standard (AES)-seeded LFSR.

Many modern applications require flexibility with respect to the ratio of available hop frequencies to number of channels required, as available bandwidth and interference environments can severely impact the number of hop frequencies available. Thus, there is a need for generating secure frequency separation constrained hopping sequences for flexible frequency hopping access (FFHA) in an efficient manner.

SUMMARY

The present invention provides frequency hopping sequences (channels) that appear totally random but are constrained to eliminate and/or control the multiple access (MA) interference at the intended receiver. Some of the sequences developed are characterized by uniform use of the available hop frequencies, as well as ideal auto and cross correlation properties. Constraints for minimum frequency separation between hopping sequences at a specific hop time may be directly accommodated. Some embodiments are characterized by efficient use of the pseudorandom keystream at the transmitter and intended receiver, as well as efficient use of processing resources at the transmitter and receiver. Specifically, pseudorandom keystream requirements do not grow with the number of channels supported as in traditional FHSS systems.

In one embodiment the method of defining the frequency hopping sequences for flexible frequency hopping access comprises receiving a pseudorandom keystream, generating a base frequency based on the pseudorandom keystream, generating a band frequency based on indexing into at least one shuffled band frequency list using at least one band frequency start point and the channel index, wherein each element of the at least one band frequency list is an integer value from the set $\{0, 1, \ldots, N_{ch}-1\}$, and wherein each of the at least one band frequency start points is based on the pseudorandom keystream, generating a jitter value based on indexing into at least one shuffled jitter value list using at least one jitter start point and the channel index, wherein each element of the at least one jitter value list is an integer value from the set $\{0, 1, \ldots, J_{range}-1\}$, wherein each of the at least one jitter start points is based on the pseudorandom keystream, and wherein $J_{range}$ is based on a minimum frequency separation constraint, and generating the hop frequency in accordance with one of two permissible equations.

This illustrative embodiment is mentioned not to limit or define the limits of the present subject matter, but to provide an example to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

BRIEF DESCRIPTION OF THE DRAWINGS

These and other features, aspects, and advantages of the present invention will become better understood with regard to the following description, claims, and accompanying drawings, where:

Figure 1:
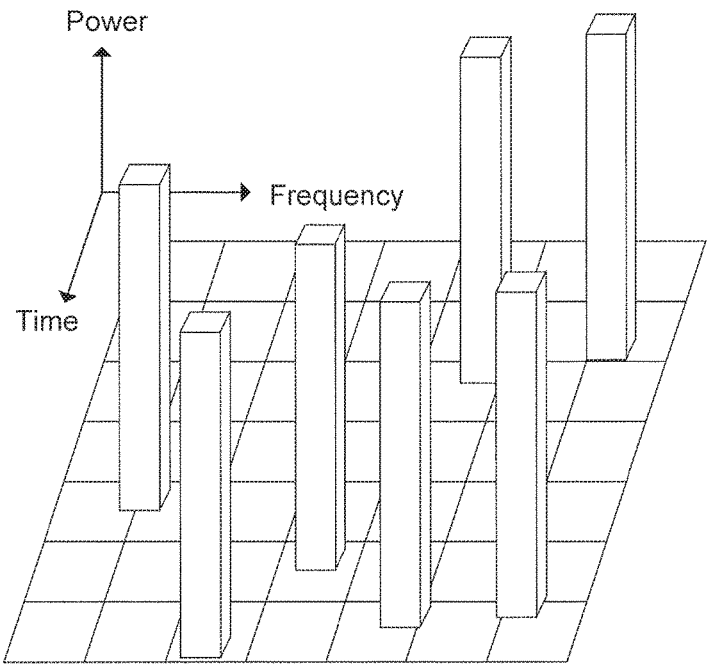
FIG. 1 is a block diagram depicting the frequency utilization vs. time for a generic FHSS communication system.

Like labels are used to refer to the same or similar modules in the drawings.

DETAILED DESCRIPTION

In the Summary above and in this Detailed Description, in the claims below, and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

A numerical example that is representative of an embodiment of the present invention is presented first to motivate salient aspects of the present invention. Descriptions of other embodiments of the present invention are then detailed, and followed by simulation results that show the efficacy of certain embodiments of the present invention.

Numerical Example of an Embodiment of the Present Invention

Embodiments of the present invention may be utilized to generate a constrained non-colliding frequency hopping sequence for each of a plurality of channels at each hop time. The following example shows the generation of the hop frequency for a channel with index 2 (out of 10 channels, i.e. $N_{ch}$=10) in a FFHA system with 100 available frequencies ($N_{freq}$=100) for a representative hop time using an embodiment of the present invention. Based on the number of channels and the number of available frequencies, the average frequency band spacing (denoted AveFreqBandSpacing) may be computed as floor($N_{freq}/N_{ch}$)=10. In this particular scenario, the AveFreqBandSpacing is equivalent to the number of available channel bands ($N_{bands}$). The minimum frequency separation constraint in this example is selected as 2 and the jitter range is computed as $J_{range}$=(AvgFreqBandSpacing−(2−1))=9.

The minimum frequency separation constraint, also referred to as the minimum band separation (MBS), is the minimum separation between the channel bands, and consequently, the minimum separation between hop frequencies of different channels. The MBS ensures that MA interference constraints are met.

For keystream utilization and processing efficiency, this embodiment computes four shuffled lists prior to hop sequence generation. The first two of these lists, band random list 0 and band random list 1 (abbreviated as $bRL_0$ and $bRL_1$, respectively) are utilized in the implementation of random frequency band selection. Random band selection is a process whereby each channel is assigned a different frequency band for the current hop period. One goal is to approximate random selection without replacement. This function could be achieved without precomputing shuffled lists but would require on order of $N_{ch}$ random numbers for selection and additional processing at each hop period.

The last of these two shuffled lists, jitter value random list 0 and jitter value random list 1 (abbreviated as $jRL_0$ and $jRL_1$, respectively), will be utilized in the implementation of random jitter value selection within each band. Random jitter value selection is a process whereby each channel is assigned a jitter value (within the selected frequency band) for the current hop period. The goal is to approximate random selection with replacement, as different channels are allowed to utilize the same jitter values. This function could be achieved without precomputing shuffled lists but would require on order of $N_{ch}$ random numbers at each hop period. $jRL_0$ is a shuffle of the valid jitter values, repeated M times, to allow the efficient shuffle table approach to approximate selection with replacement. In contrast, $jRL_1$ is a shuffled list of a single copy of the valid jitter values.

In an embodiment, the aforementioned lists of indices or values are shuffled via a Fisher-Yates shuffle (using the modern Durstenfeld Algorithm). In another embodiment, the lists may be shuffled by repeatedly swapping elements based on a random input.

As described in the Summary, the selection of hop frequencies for each of the frequency hopping sequences (channels) may be computed independently for each hop period. Therefore, the description of the processing for the selection of hop frequencies for each of the channels at a specific hop time provided below is sufficient to define the processing for the full channel hop sequence over all time.

A pseudorandom keystream, which may be an AES keystream in an embodiment, is partitioned into K-bit segments. Due to the random nature of the bits in the AES keystream, the resulting K bit segments, viewed as unsigned integers, will have a uniform distribution from 0 to $2^K-1$. These K bit segments are mapped by a function U(Input,K,R) to provide values with an approximate uniform distribution over a smaller range (0 to R−1). In this embodiment the function U(Input,K,R) is defined simply as:

$$U(\text{Input}, K, R) = \text{floor}\left(\text{Input} * \frac{R}{2^K}\right) \quad \text{Eq (1)}$$

In another embodiment, the number of bits selected to transform into a uniformly distributed random number may depend on the length of the output range. For example, the number of bits selected to generate the base frequency ($f_{base}$), which ranges from 0 to $N_{freq}-1$, can be different from the number of bits selected to generate the first band frequency start point ($b_0$), which ranges from 0 to $N_{ch}-1$. The number of bits (K) selected can, in an embodiment, be based on the divisibility of the input range (0 to $2^K-1$) and the required output range.

Figure 2:
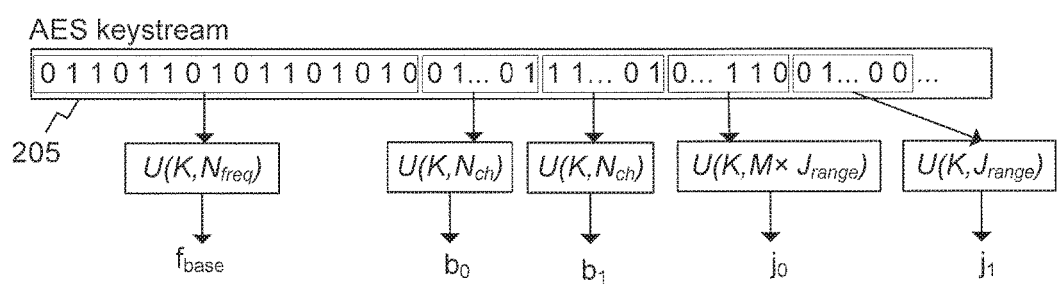
FIG. 2 shows the partitioning of a pseudorandom keystream to provide the random parameters necessary to implement the flexible frequency hopping access (FFHA) algorithm, according to an embodiment of the present invention.

The process shown in FIG. 2 generates five approximately uniformly distributed numbers ($f_{base}$, $b_0$, $b_1$, $j_0$, $j_1$) from an AES keystream 205 that will be utilized to select the hop frequency for all channels at the current hop time. For example, as shown in FIG. 2, the first K=16 bits from the AES keystream are used to generate the base frequency, $f_{base}$, which is a uniformly distributed random number between 0 and $N_{freq}-1$. Numerous ciphers (or cryptographic generators) can be employed to generate the pseudorandom keystream at the transmitter and receiver including legacy ciphers such as Data Encryption Standard (DES), Triple DES, International Data Encryption Algorithm (IDEA), Twofish, and Serpent). In other embodiments, the pseudo-random keystream may be a Threefish block cipher.

Figure 3:
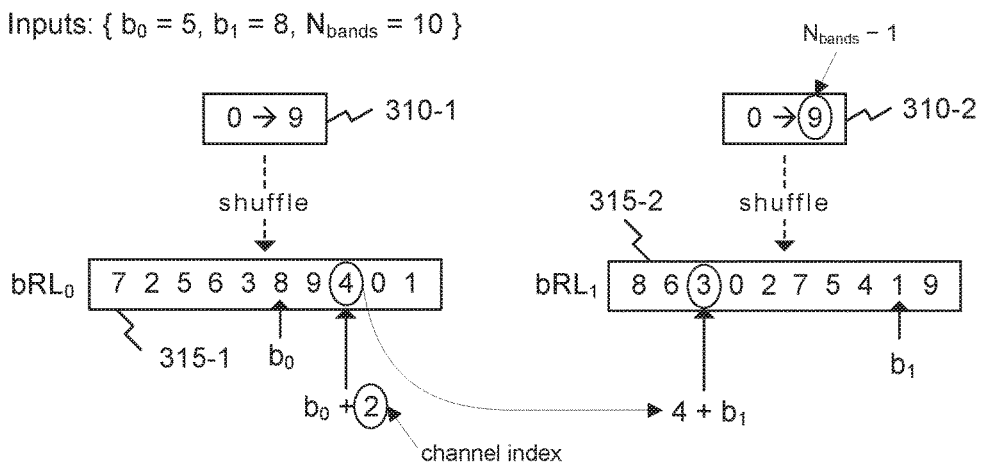
FIG. 3 depicts the dual-shuffle band frequency selection process for each channel, according to an embodiment of the present invention.

FIG. 3 depicts the frequency band selection process for channel index 2 (ch=2) given the initial input of $b_0=5$ and $b_1=8$. As noted above, there are 10 available channel bands, which are depicted as unshuffled lists 310-1 and 310-2 in FIG. 3. The shuffling operation shown in FIG. 3, which transforms the unshuffled lists 310-1 and 310-2 into shuffled lists 315-1 and 315-2, respectively, are performed during the initialization process. The dual shuffle band select process is defined mathematically (table index modulo functions not shown to improve readability) as:

$$\text{Temp}=bRL0[b_0+ch] \quad \text{Eq(2)}$$

$$f_{band}=bRL1[b_1+\text{Temp}] \quad \text{Eq (3)}$$

As shown in FIG. 3, the initial inputs of $b_0=5$ and $b_1=8$ are used to generate $f_{band}=3$ by consecutively indexing into two shuffled lists using the random generated inputs and the channel index.

Figure 4:
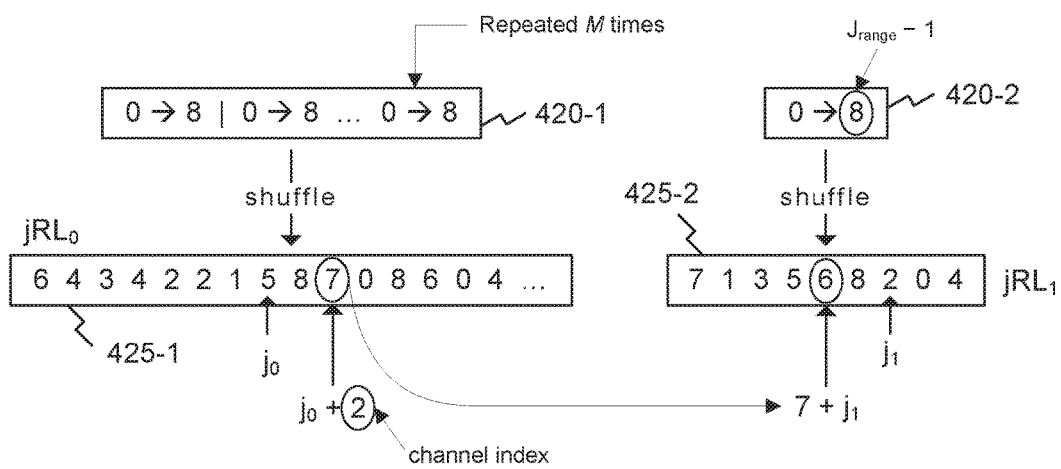
FIG. 4 depicts the dual-shuffle jitter value selection process for each channel, according to an embodiment of the present invention.

FIG. 4 depicts the jitter value selection process for channel index 2 given the initial input of $j_0=7$ and $j_1=6$ with jitter range, $J_{range}=9$, as noted above. As in the case of the generation of the band frequency, the shuffling operation that transforms the unshuffled lists 420-1 and 420-2 into shuffled lists 425-1 and 425-2, respectively, are performed during the initialization process. The dual shuffle jitter select process is defined mathematically (table index modulo functions not shown to improve readability) as:

$$\text{Temp}=jRL0[j_0+ch] \quad \text{Eq (4)}$$

$$J_{value}=jRL1[j_1+\text{Temp}] \quad \text{Eq (5)}$$

The initial inputs of $j_0=7$ and $j_1=6$ are used to generate $J_{value}=6$ by consecutively indexing into two shuffled lists using the random generated inputs and the channel index, as shown in FIG. 4. Furthermore, the unshuffled list 420-1 comprises the permissible jitter values, 0 to $J_{range}-1$, repeated M=16 times, and the unshuffled list 420-2 comprises the permissible jitter values repeated only once, which enables this mechanism to approximate selection with replacement.

Having generated the base frequency ($f_{base}$), the band frequency ($f_{band}$) and the jitter value ($J_{value}$), the hop frequency for a channel during the current hop interval is computed as:

$$f_{hop}=(f_{base}+\text{floor}(N_{freq}/N_{ch}) \times f_{band}+J_{value}) \text{ modulo } N_{freq}. \quad \text{Eq (6)}$$

In another embodiment, the hop frequency for a channel during a current hop interval is computed as:

$$f_{hop}=(f_{base}+\text{floor}(N_{freq}/N_{ch} \times f_{band})+J_{value}) \text{ modulo } N_{freq}. \quad \text{Eq (7)}$$

Figure 5A:
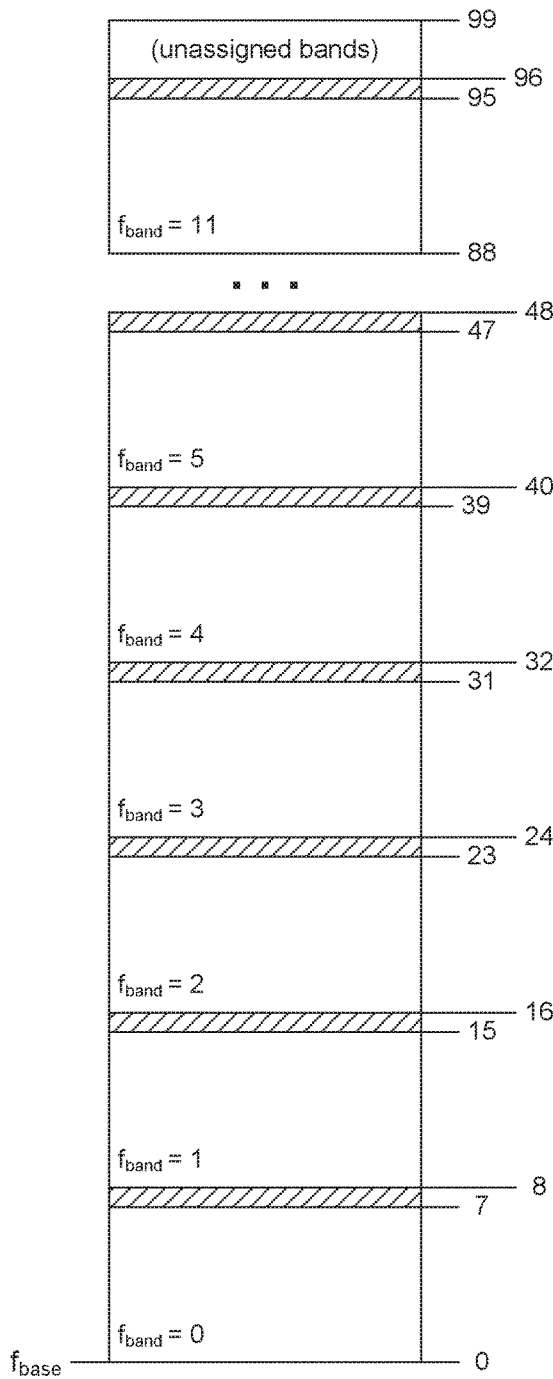
FIGS. 5A and 5B show the comparison of frequency band allocations subject to a minimum frequency separation constraint, according to embodiments of the present invention.
Figure 5B:
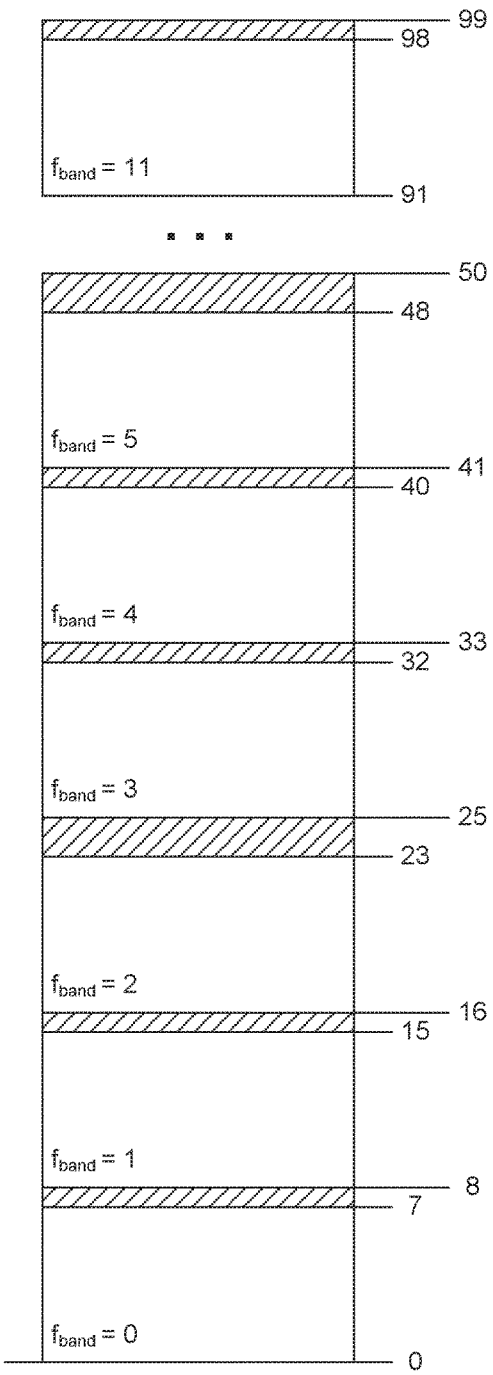

When $N_{freq}$ is a multiple of $N_{ch}$, Eq (6) and Eq (7) produce identical results. However, when $N_{freq}$ is not a multiple of $N_{ch}$, Eq (6) will result in identical band spacing whereas Eq (7) results in maximum band spacing (with some bands spaced as in Eq (6) and others spaced an additional hop frequency apart). For example, FIGS. 5A and 5B compare the frequency band allocations when subject to the minimum frequency separation constraint (MBS=2) with $N_{freq}=100$, $N_{ch}=12$ (wherein $N_{freq}$ is not a multiple of $N_{ch}$) and $f_{base}=0$, which results in an AvgFreqBandSpacing=8. As seen in FIG. 5A, the allocated frequency bands are uniformly spaced when Eq (6) is used, but there are unassigned frequencies furthest away from $f_{base}$. That is, each of the available frequencies is designated as a frequency in a frequency band, a frequency subject to the minimum frequency separation constraint (wherein separates frequency bands), or a frequency that cannot be designated as either.

In contrast, FIG. 5B shows the result when Eq (7) is used, and the complete $N_{freq}$ available frequencies are allocated with some instances of the minimum band spacing being 2 instead of 1. That is, each of the available frequencies is designated to be either a frequency in a frequency band or a frequency subject to the minimum frequency separation constraint, and there are no unassigned frequencies as in the case of FIG. 5A. Assuming the system parameters are ($N_{freq}=100$, $f_{band}=7$, $J_{value}=4$, $f_{base}=0$), the allocated hop frequency for FIG. 5A is $f_{hop}=60$, whereas the allocated hop frequency for FIG. 5B is $f_{hop}=62$.

Mapping FFHA Indices to the Frequency Spectrum

In the above example, and for the remainder of this Detailed Description, the Claims and Drawings, there is an implicit mapping from $f_{hop}$ to a frequency in the frequency spectrum, as is well known to one skilled in the art. That is, the parameters $f_{base}$, $f_{band}$, and $J_{value}$ are indices as used herein, and one or more of them may be used to compute $f_{hop}$ in accordance with embodiments of the present invention. This is followed by a mapping from the $f_{hop}$ index to a frequency in the frequency spectrum.

In an example, the available frequencies may be between 2.0 GHz and 2.5 GHz with a 5 MHz frequency hopping bandwidth. This available frequency spectrum may therefore be divided into 200 channels, with the first channel (with channel index ch=1) occupying 2.000 GHz to 2.005 GHz, the second channel (with channel index ch=2) occupying 2.005 GHz to 2.010 MHz, and so on. The center frequencies for these frequency hopping channels will be 2.0025 GHz and 2.0075 GHz, respectively, and so on.

The center frequencies (or equivalently, the start and end points of the hopping bandwidth) can be stored in a table which is indexed using the channel index. For the above example, a full table with 200 rows can store the available frequency information. The examples above describe a system with $N_{freq}=100$ available frequencies and thus 100 rows may be deleted from the full table. These deleted rows may or may not be adjacent. That is, if the only available spectrum in a specific scenario is non-contiguous, then those non-adjacent rows that correspond to the unavailable frequencies may be deleted.

Embodiments of the present invention may be implemented in any allowable portion of the frequency spectrum, contiguous or non-contiguous, with any (not necessarily equal) frequency hopping bandwidth. However, the mapping between indices and frequencies in the frequency spectrum is a monotonic function. That is, a higher index corresponds to a higher frequency in the frequency spectrum.

Other Embodiments of the Present Invention

As discussed in the above numerical example, the shuffled lists ($bRL_0$, $bRL_1$, $jRL_0$ and $jRL_1$) are generated during initialization and are re-used at each hop interval. That is, for each hop period, a newly received AES keystream is partitioned into K-bit pieces that are used to regenerate the parameters ($f_{base}$, $b_0$, $b_1$, $j_0$, $j_1$), which are subsequently used to index into the pre-computed shuffled lists to generate the frequency hopping sequence for that hop period. Re-using the shuffled lists is an efficiency that obviates the necessity of re-shuffling the list of indices at each hop period, which is a computationally expensive process that grows in proportion with the number of bands.

Figure 6A:
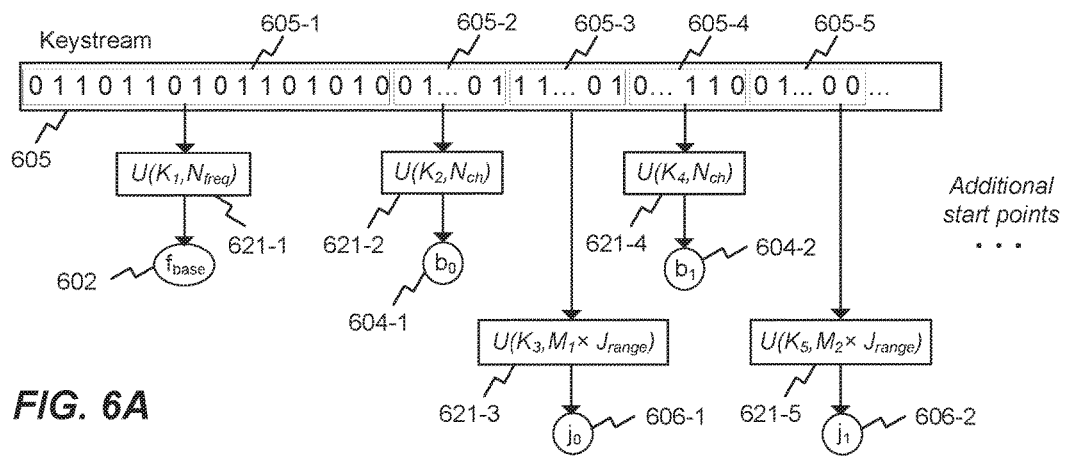
FIGS. 6A, 6B and 6C show the multi-parameter generation and multi-shuffle indexing processes to securely and efficiently generate hopping frequencies, according to another embodiment of the present invention.
Figure 6B:
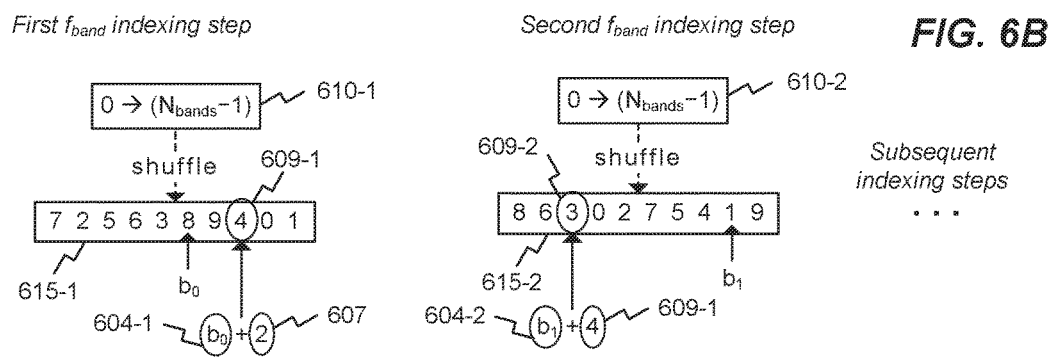
Figure 6C:
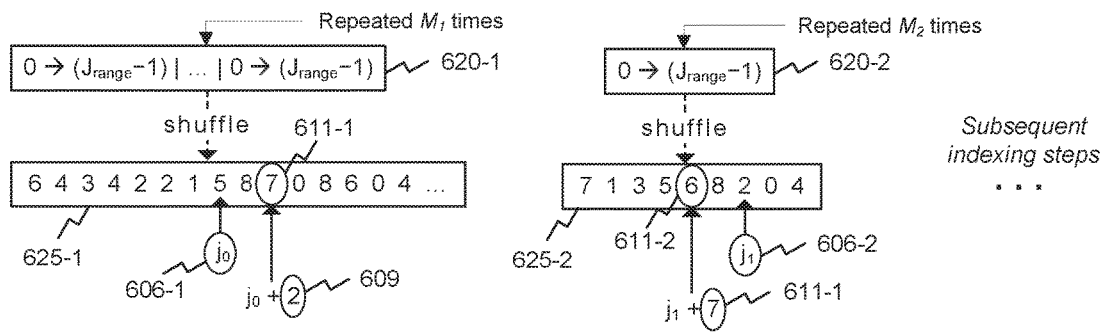

FIGS. 6A, 6B and 6C depict the generalized process, according to an embodiment of the present invention that can securely and efficiently generate hopping frequencies. FIGS. 6A, 6B and 6C include some features and/or components that are similar to those shown in FIGS. 2-4 and described above. At least some of these features and/or components may not be separately described in this section. Furthermore, in the context of FIGS. 6A, 6B and 6C, which describe the generation of multiple parameters and multiple indexing steps in accordance with the embodiments of the present invention, the label -x is used to denote the last indexing step, which is equivalent to the total number of indexing steps.

FIG. 6A shows a keystream 605 being used to generate the base frequency 602 and a plurality of start points. That is, a first portion 605-1 of the keystream is used to generate the base frequency 602 using the function 621-1 that converts the bits into a uniformly distributed random integer between 0 and $N_{freq}-1$. Similarly, portions 605-2 and 605-3 are used to generate the first band frequency start point 604-1 and a first jitter value start point 606-1, respectively. And as shown in FIG. 6A, distinct numbers of bits ($K_1$, $K_2$, $K_3$ . . . ) may be used to generate each of the required parameters. Using different portions of the keystream to generate additional parameters are compatible with embodiments of the present invention described herein. For example, the first and second portions of the keystream (605-1 and 605-2) may be used to generate the second set of start points, i.e. the second band frequency start point 604-2 and the second jitter value start point 606-2.

A multi-shuffle band frequency selection process is shown in FIG. 6B, wherein the first indexing step comprises transforming the unshuffled list 610-1, comprising the elements 0 through ($N_{band}-1$), into a shuffled list 615-1, and using the first band frequency start point 604-1 and the channel index 607 to index into the shuffled list 615-1 to generate an output 609-1.

An embodiment of the present invention eliminates the second stage of shuffling for band and jitter selection and thus only requires the shuffled lists $bRL_0$ and $jRL_0$ and the random parameters $f_{base}$, $b_0$, and $j_0$ as described in the numerical example above, and thus the output 609-1 is the band frequency.

In another embodiment, the output 609-1 is used in conjunction with the second band frequency start point 604-2, generated in FIG. 6A, to index into a second shuffled list 615-2. This second step of indexing into a second shuffled list generates an output 609-2, which is the band frequency since only two indexing steps are used in this embodiment.

In yet another embodiment, additional indexing steps may be employed to generate the band frequency. For example, a subsequent indexing step would use the Fisher-Yates algorithm to transform the unshuffled list 610-x to the shuffled list 615-x. The x-th band frequency start point 604-x would be used in conjunction with the output from the previous indexing step 609-(x-1) to generate an output 609-x, which is the required band frequency. Using any number of band frequency indexing steps is compatible with embodiments of the present invention.

FIG. 6C shows the multi-shuffle jitter value selection process that comprises multiple indexing steps. In each of the indexing steps, the unshuffled lists 620-1, 620-2 . . . 620-x are transformed into the shuffled lists 625-1, 625-2 . . . 625-x, respectively. Each of the unshuffled (and shuffled) lists may comprise distinct number of multiple copies of the valid range of jitter values (0 to $J_{range}-1$). In the example shown in FIG. 6C, $M_1=16$ and $M_2=1$. In a manner similar to the band frequency selection process, the jitter value selection process comprises using the sum of the channel index 609 and the first jitter value start point 606-1 to index into the first shuffled list 625-1 to generate an output 611-1. If only one jitter value indexing step is used, the output 611-1 is the jitter value.

If multiple indexing steps are used to generate the jitter value, the sum of the previous output 611-(x-1) and the most recent start point 606-x is used to index into the most recent shuffled list 625-x to generate the output 611-x, which is the required jitter value. Using any number of jitter value indexing steps, as described herein, is compatible with embodiments of the present invention.

In another embodiment of the present invention, the single stage shuffle lists ($bRL_0$ and $jRL_0$) are regenerated at each hop period. That is, the start point parameters ($b_0$, $j_0$) are generated during the initialization process, and are re-used to index into the shuffled lists at each hop period. Alternatively, since the shuffled lists are regenerated at each hop period, degenerate values for the start points may be employed. For example, setting the start points to zero (or some other valid constant) results in operation that is identical to the start points being based on a random keystream.

In yet another embodiment of the invention, the band frequency is generated based on indexing into at least one shuffled list using at least one frequency band start point and the channel index, but the jitter values are generated based on the random keystream. That is, instead of employing the indexing steps described above, the jitter values are generated based on non-overlapping portions of the random keystream.

Figure 7A:
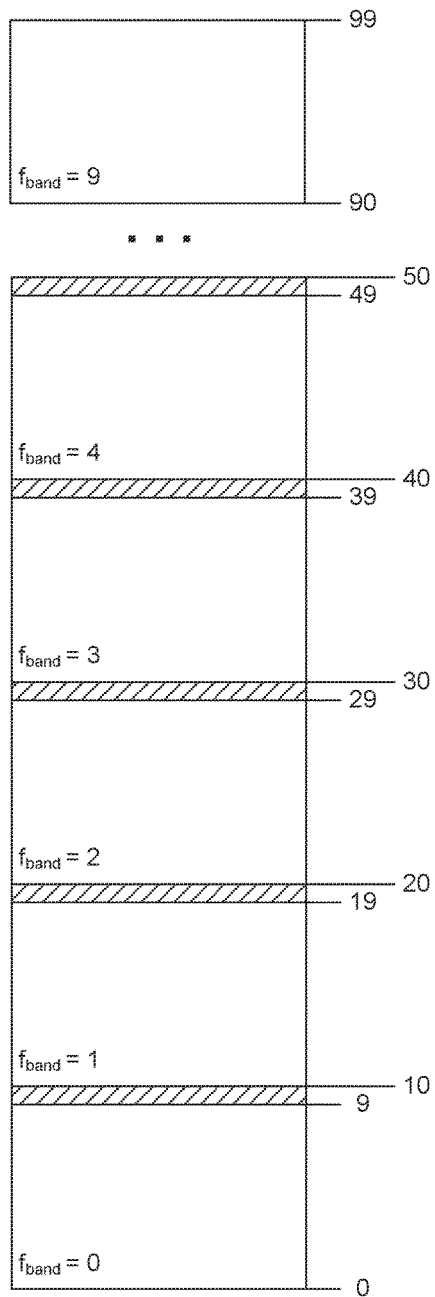
FIGS. 7A and 7B show another comparison of frequency band allocations subject to a minimum frequency separation constraint, according to embodiments of the present invention.

FIG. 7 compares the frequency band allocations when subject to the minimum frequency separation constraint (MBS=2), for the parameters $N_{freq}=100$, $N_{ch}=10$ and $f_{base}=0$, according to two different embodiments of the present invention. FIG. 7A, which is similar to FIG. 5A, provides the framework for using Eq (6) to compute the hop frequency for each of the channels in each hop period. That is, each of the $N_{ch}=10$ channels will be allocated to a distinct one of the frequency bands ($f_{band}=0, 1 . . . 9$).

Figure 7B:
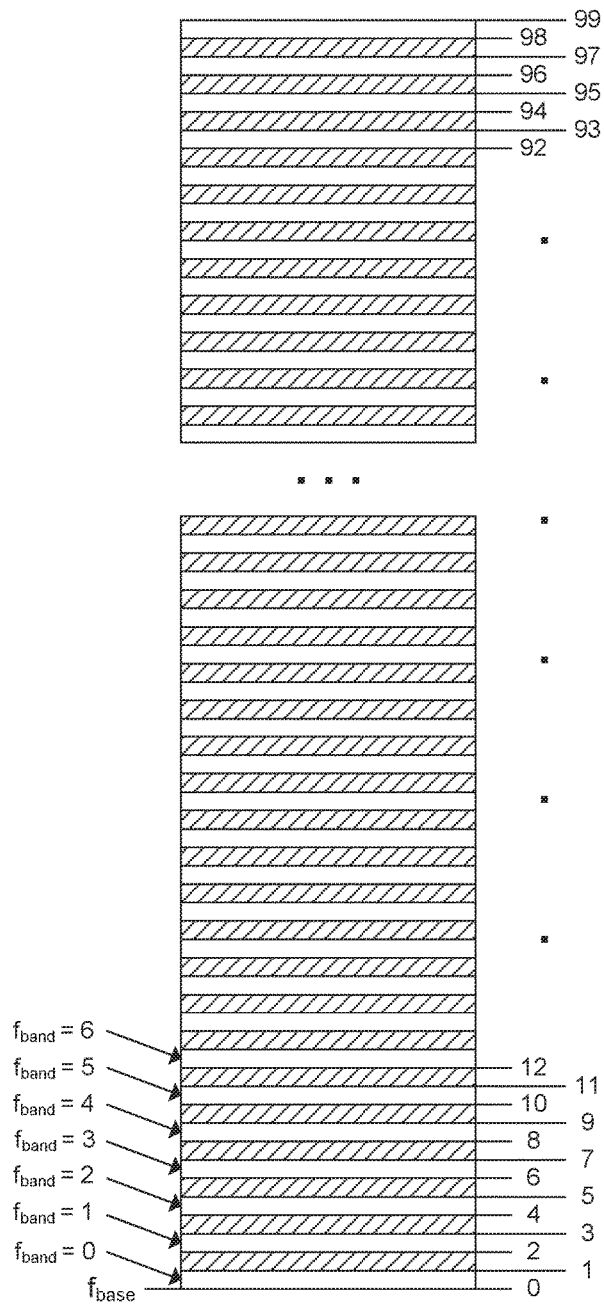

In contrast, the frequency band allocation shown in FIG. 7B provides the framework for using another embodiment of the present invention, which does not require using a jitter value. The number of frequency bands is initially computed as $N_{band}=\text{floor}(N_{freq}/\text{MBS})=50$, and the hop frequency is determined using the following equation:

$$f_{hop}=(f_{base}+f_{band}\times\text{MBS})\,\text{modulo}\,N_{freq} \qquad \text{Eq (8)}$$

In Eq (8), $f_{band}$ may be determined by using multiple indexing steps as described above in the context of FIG. 6B. As shown in the example in FIG. 7B, the number of available frequencies is partitioned into 50 frequency bands, out of which $N_{ch}=10$ channels will be selected based on Eq (8). In both FIGS. 7A and 7B, each channel will be allocated to a distinct frequency band. In FIG. 7A, the selected channels will necessarily have a greater average spacing since each channel is selected within a relatively broad frequency band, but in the framework of FIG. 7B, the selected channels may span a smaller frequency range since the selected channels may be close to each other (while maintaining the minimum band spacing).

As discussed in other embodiments of the present invention, the multiple indexing steps used to generate the band frequency across several hop periods, when employing Eq (8), may be implemented by using a single set of shuffled lists across all hop periods, and regenerating the frequency band start points (based on the pseudorandom keystream) at each hop period. Alternatively, the shuffled lists may be regenerated at each hop period and the start points may be reused across all hop periods. In this latter approach, and as discussed above, the start points may be generated based on the pseudorandom keystream, or be degenerate (or constant) values since the shuffled lists are being regenerated at each hop period.

Figure 8:
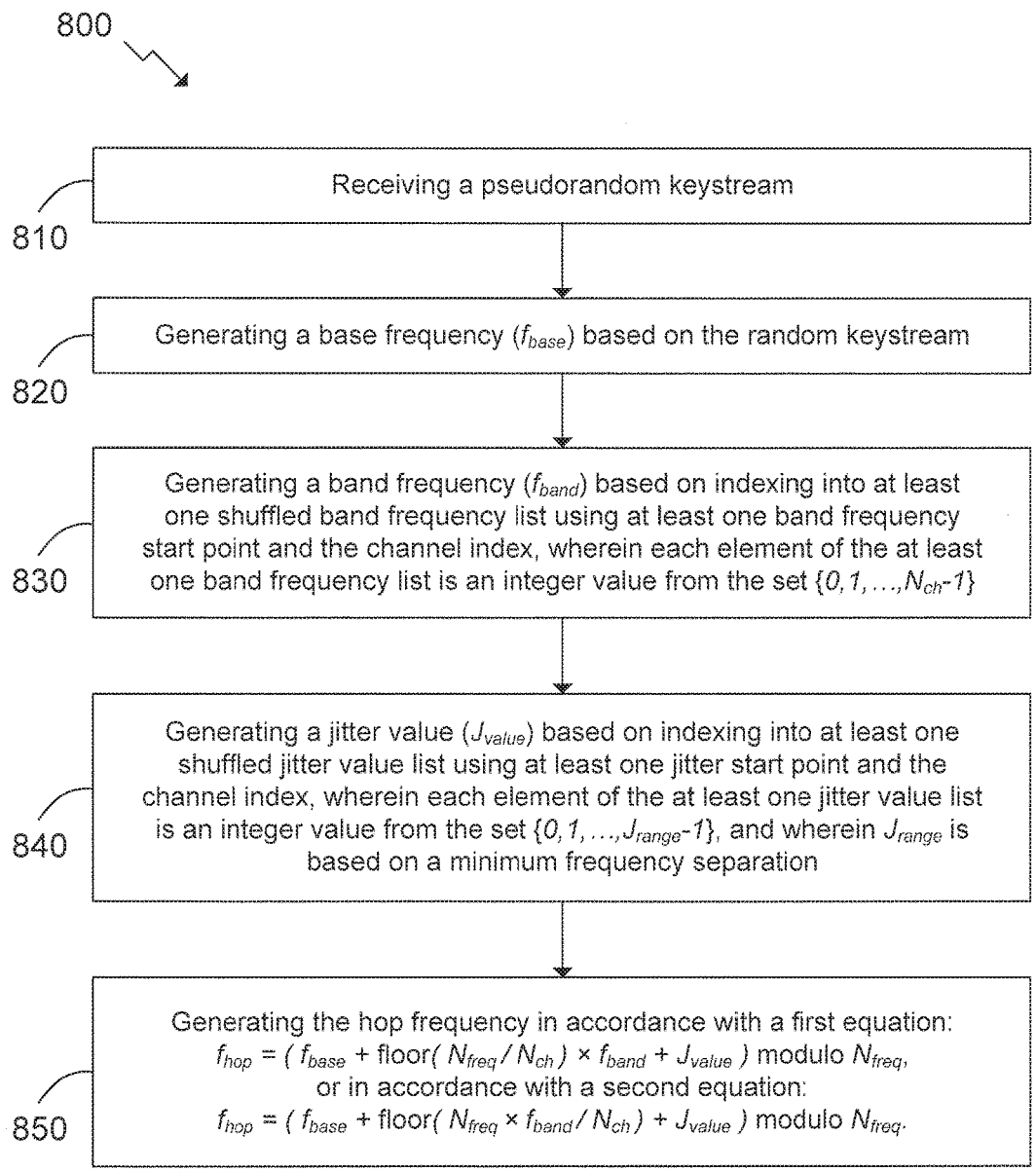
FIG. 8 is a flow chart for a method for secure and efficient flexible frequency hopping access, according to an embodiment of the present invention.

FIG. 8 is a flowchart of a method for secure and flexible FFHA operations according to an embodiment of the present invention. In some embodiments, the order of steps may be changed. Furthermore, some of the steps in the flowchart may be skipped or additional steps added. The method 800 begins at step 810 which comprises receiving a random keystream. The random keystream may be an AES keystream, may be generated using a Threefish block cipher, or an equivalent state of the art cryptographic source.

The method continues at step 820, wherein the random keystream is partitioned into at least one K-bit portion, which is used to generate the band frequency ($f_{base}$). The other parameters (the at least one band frequency start point and the at least one jitter start point) may also be generated using K-bit portions of the random keystream in other embodiments of the present invention. In an embodiment, the transformation from the keystream to the uniformly distributed random parameter is based on the U(Input,K,R) function as defined above and Eq (1).

In another embodiment, the keystream may be partitioned differently to generate at least one of the required parameters ($f_{base}$, at least one band frequency start point, and at least one jitter start point) using the modulo operation (wherein % is used to denote the modulo operation). For example, a Q-bit portion of the keystream is representative of a number (denoted $Q_0$) between 0 and $2^Q-1$, and the base frequency ($f_{base}$) is generated by computing ($Q_0 \% N_{freq}$). The other start points can be similarly generated using their specified ranges.

At step 830, a band frequency is generated based on indexing into at least one shuffled band frequency list using at least one band frequency start point. As discussed above, the at least one band frequency start point may be regenerated at each hop period and the shuffled lists may be used for all hop periods, or alternatively, the shuffled lists can be regenerated at each hop period and the start points may be initialized either based on a random keystream or using constant values (degenerate or otherwise). Both these embodiments approximate selection without replacement, as is discussed above.

An unshuffled band frequency list comprises of the elements $\{0, 1 \ldots N_{ch}-1\}$, and is shuffled to generate each of the at least one shuffled band frequency lists (denoted $bRL_0$, $bRL_1$, $bRL_2 \ldots$). Correspondingly, at least one band frequency start point ($b_0$, $b_1$, $b_2 \ldots$) is generated.

The first step of generating the frequency band comprises indexing into the first shuffled band frequency list ($bRL_0$) using the sum of the first band frequency start point and the channel index ($b_0$+ch_idx). If only one indexing step is to be employed, the indexed value in $bRL_0$ is the final band frequency. If a second indexing step is used, the second shuffled band frequency list ($bRL_1$) is indexed into using the sum of the second band frequency start point and the index value from $bRL_0$. This process is repeated for as many indexing steps as are specified, and approximates selection without replacement from the elements $\{0, 1 \ldots N_{ch}-1\}$.

Similarly, at step 840, a jitter value is generated based on indexing into at least one shuffled jitter value list using at least one jitter value start point. The embodiments described above, as applied to the jitter value selection process, approximate selection with replacement, as is discussed above. An unshuffled jitter value list comprises one or more copies of the elements $\{0, 1 \ldots J_{range}-1\}$, and is shuffled to generate each of the at least one shuffled jitter value lists (denoted $jRL_0$, $jRL_1$, $jRL_2 \ldots$). Correspondingly, at least one jitter value start point ($j_0$, $j_1$, $j_2$, ...) is generated.

The first step of generating the jitter value comprises indexing into the first shuffled jitter value list ($jRL_0$), which is of length $M_1 \times J_{range}$, using the sum of the first jitter value start point and the channel index ($j_0$+ch_idx). Subsequent indexing steps comprise indexing into the respective shuffled jitter value list ($jRL_i$) using the sum of the respective jitter value start point and the indexed value from the previous shuffled jitter value list, ($j_i+(jRL_{i-1})_{indexed\_val}$). Each of the subsequent jitter value lists may comprise the elements repeated a distinct and arbitrary number of times to approximate selection with replacement from the element $\{0, 1 \ldots J_{range}-1\}$.

At step 850, the hop frequency is generated based on either Eq (6) or Eq (7).

Figure 9:
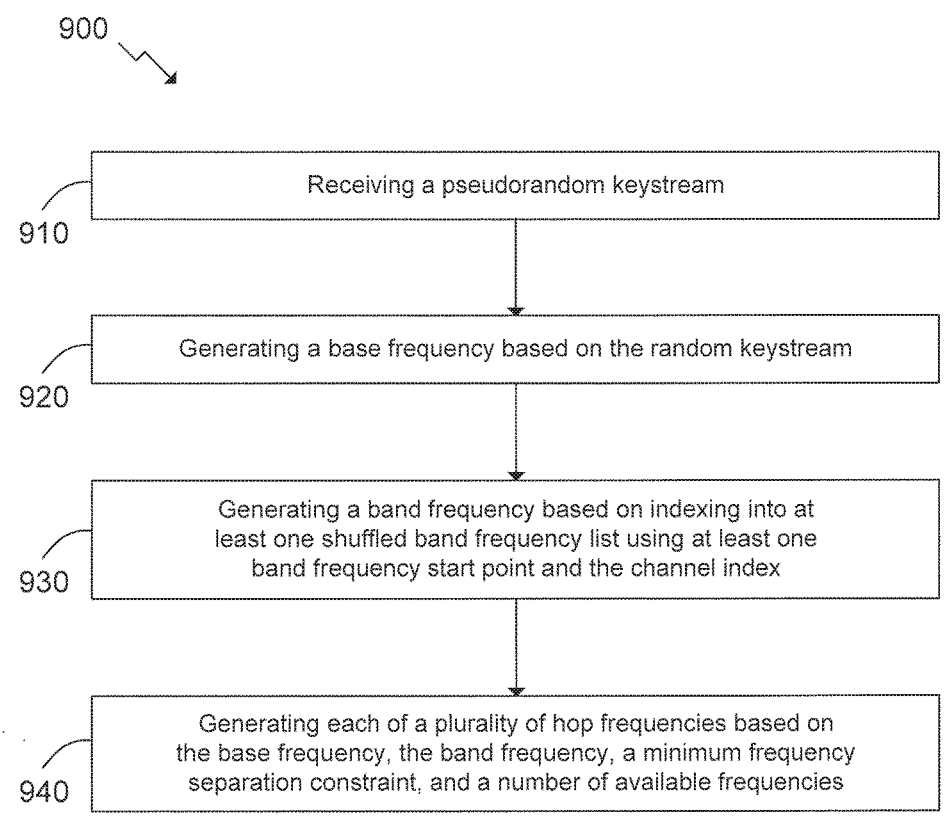
FIG. 9 is a flowchart for a method for secure and efficient flexible frequency hopping access, according to another embodiment of the present invention.

FIG. 9 is a flowchart of a method for secure and flexible FFHA operations according to another embodiment of the present invention. In some embodiments, the order of steps may be changed. Furthermore, some of the steps in the flowchart may be skipped or additional steps added. This flowchart includes some steps that are similar to those shown in FIG. 8 and described above. At least some of these steps may not be separately described in this section.

The method 900 shown in FIG. 9 begins at step 910 wherein a keystream is received after, in an embodiment, being generated by a processor, a field-programmable gate array, or another cryptographic source. In step 920, the keystream (which is a stream of bits in an embodiment) comprises a portion that is used to generate the base frequency, which is a uniformly generated random number in a specified range. The transformation of the bits to the random range in the range $[0,N_{freq}-1]$ may be accomplished using the function described in Eq (1). Alternatively, the modulo function can generate the base frequency. Either of these embodiments to generate the base frequency is compatible with other embodiments of the present invention, as described herein.

At step 930, a band frequency ($f_{band}$) is generated in the range $[0,N_{ch}-1]$; as described in the context of FIG. 6B, the band frequency may be generated for a hop period by indexing into one or more shuffled lists, using the channel index and start points that are generated based on the keystream. In an embodiment, indexing into a single shuffled list can generate the band frequency, whereas in another embodiment two shuffled lists are used. Using any number of shuffled lists to generate the band frequency is compatible with other aspects of the present invention since step 930 is directed towards approximating selection without replacement.

In another embodiment, step 930 comprises computing $N_{band}$=floor($N_{freq}$/MBS) and then generating the band frequency in the range [0,$N_{band}$−1] using one or more indexing steps as described in FIG. 6B.

At step 940, the plurality of hop frequencies for each of the channels (for a specific hop period) are generated based on the base frequency, the band frequency, the minimum frequency separation constraint and the number of available frequencies.

In an embodiment, step 940 comprises determining a range of jitter values based on the minimum frequency separation constraint, and then generating the jitter value from within this range. In an embodiment, and as described in the context of FIG. 6C, the jitter value may be generated for a channel during a hop period by indexing into one or more shuffled lists, using the channel index and start points that are generated based on the keystream. Alternatively, the jitter value may be generated by directly transforming bits from the keystream into a uniformly generated random number in the range [0,$J_{range}$−1]. Having generated the base frequency, the band frequency and the jitter value, the hop frequency may be computed using Eq (6) or Eq (7).

In another embodiment, a jitter value is not computed and Eq (8) may be used to compute the hop frequency, which only depends on the base frequency, the band frequency and the minimum band spacing.

Flexibility with Respect to Available Hop Frequency and Bandwidth Resources

The FFHA embodiments described above are applicable to the scenarios where:

$$N_{ch} \leq MBS \times N_{freq}. \quad \text{Eq (9)}$$

As discussed above, MBS is the minimum band separation that is greater than zero to ensure MA interference constraints are met. Scenarios having more channels than the number of hop frequencies available will necessarily experience collisions between some sets of hopping sequences. The FFHA embodiment discussed below shows how MA interference is controlled for applications where:

$$N_{ch} \geq MBS * N_{freq}. \quad \text{Eq (10)}$$

The approach is to partition the channels into subsets for which Eq (9) is satisfied (i.e., Eq (9) is satisfied with $N_{ch}$ representing the number of channels in each subset), and provide a separate $f_{base}$ for each of the subsets. These subsets will correspond to specific sets of users or uses that are typically characterized by spatial separation between the users or uses of other subsets. This embodiment maintains the desired security properties and is characterized by no MA interference within a subset while minimizing the MA interference between subsets (direct hits between channels in different subsets occurring at an average rate of 1/$N_{freq}$).

Many modern communication systems utilize different bandwidths for different data flows. Systems employing FFHA (as described in various embodiments of the present invention) can support variable bandwidth requirements through a number of techniques.

Under conditions where the bandwidth varies with different time periods (wherein all nodes transmit at the same time and utilize identical bandwidth), the embodiments described above may be simply implemented (with different parameters) for each of the different time periods.

Under conditions where different bandwidth channels utilize the same time period and the allocated spectrum is significantly larger than the total number of channels times the bandwidth of the widest channel, the FFHA approach may be utilized based on the narrowest channel bandwidth with reduced jitter on wider bandwidth channels.

Under conditions where different bandwidth channels utilize the same time period and the allocated spectrum is significantly less than the total number of channels times the bandwidth of the widest channel, separate FFHA computations may be implemented for each channel bandwidth type and random shuffle (including methods described above) between the bands of all band types can be performed as a final step.

FFHA Simulation Results

Figure 10:
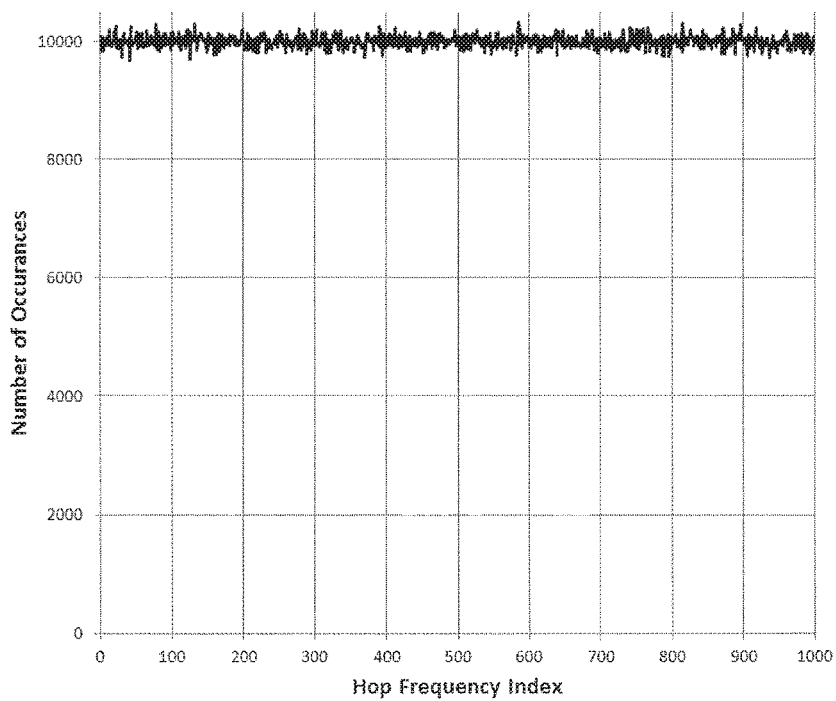
FIG. 10 shows simulation results demonstrating uniform use of frequencies for a single FFHA hop sequence (channel), according to another embodiment of the present invention.

FIG. 10 provides a histogram for the number of times each of 1000 available hop frequencies are utilized for the case of a hop sequence of length 10,000,000. This case demonstrates uniform use of frequencies, since each bin (hop frequency shown along x-axis) is expected to be utilized an average of 10,000 times.

Figure 11:
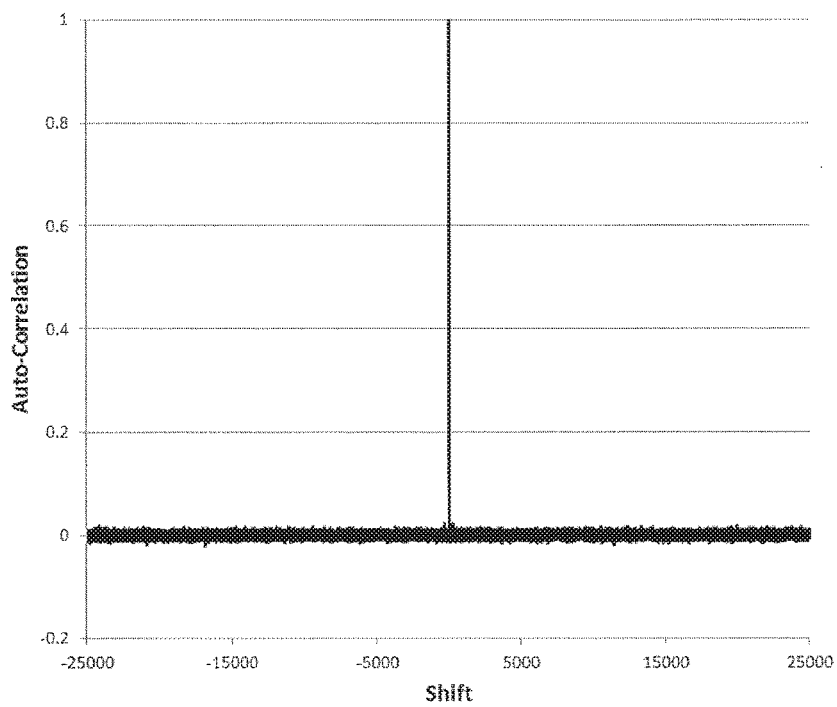
FIG. 11 shows simulation results demonstrating ideal auto-correlation properties of the FFHA generated hop sequence (channel), according to yet another embodiment of the present invention.

FIG. 11 shows the length 50,000 auto-correlation properties for the hop sequence (channel) produced. The FFHA produced hopping sequence (channel) depicts no undesired periodic correlation properties.

Figure 12:
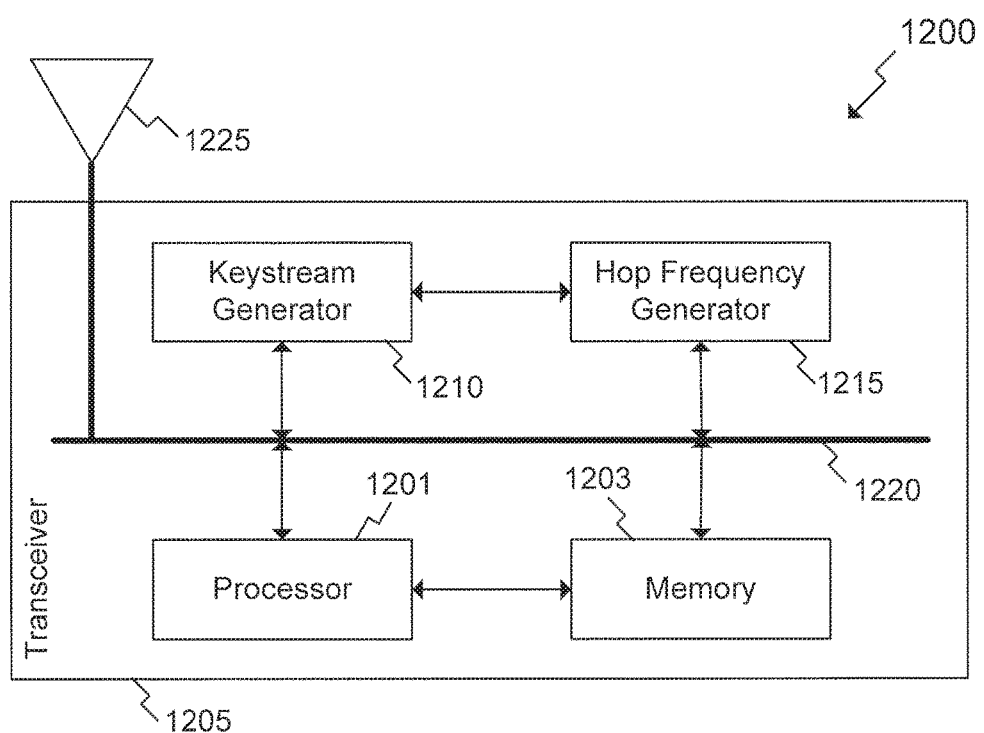
FIG. 12 is a block diagram of a transceiver for secure and efficient flexible frequency hopping access, according to one embodiment of the present invention.

A transceiver for secure and efficient FFHA that implements an embodiment of the present invention is shown in FIG. 12. A processor 1201 is connected to a memory 1203 that interfaces with a keystream generator 1210 and a hop frequency generator 1215 via an interface 1220. The keystream generator 1210 is configured to generate a random keystream, which is subsequently used by the hop frequency generator 1215 to generate the base frequency and the final hop frequency for each channel (and each hop period), based on generating intermediate start points and shuffled lists.

In an embodiment, the keystream generator 1210 and the hop frequency generator 1215 may be embedded in the processor 1201. In another embodiment, the keystream generator may be implemented in a field programmable gate array (FPGA) and the hop frequency generator may be implemented in software. In yet another embodiment, both the keystream generator and the hop frequency generator may be implemented in software, either in an ARM or other processor.

The processor 1201 shown in FIG. 12 may comprise component digital processors and may be configured to execute computer-executable program instructions stored in memory 1203. For example, the component digital processors may execute one or more computer programs for receiving or generating a random keystream, generating random start points and shuffled lists, generating a base frequency, band frequencies and jitter values based on the random start points and shuffled lists, and communicating on different frequencies as specified by the generated frequency hopping sequence in accordance with embodiments of the present invention.

Processor 1201 may comprise a variety of implementations for the computation of link quality metrics, average cost functions and rate-loss cost functions, and minimization and selection operations, as well as a microprocessor, a digital signal processor (DSP), an application-specific integrated circuit (ASIC), one or more field programmable gate arrays (FPGAs), state machines, or the like. Processor 1201 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 1203 may comprise a non-transitory computer-readable medium that stores instructions which, when executed by the processor 1201, cause the processor 1201 to perform various steps, such as those described herein. Examples of computer-readable media include, but are not limited to, electronic, optical, magnetic, or other storage or transmission devices capable of providing the processor 1201 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 1201 and the processing described may be in one or more structures, and may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A method of generating a hop frequency ($f_{hop}$) for each of a plurality of channels, the hop frequency being one of a plurality of hop frequencies, a number of the plurality of hop frequencies being equal to a number of the plurality of channels ($N_{ch}$), the plurality of hop frequencies being subject to a minimum frequency separation constraint, a number of a plurality of available frequencies ($N_{freq}$) being greater than or equal to a product of the number of the plurality of hop frequencies and the minimum frequency separation constraint, each of the plurality of channels comprising a channel index, the method comprising:
   receiving a pseudorandom keystream;
   generating a base frequency ($f_{base}$) based on the pseudorandom keystream;
   generating a band frequency ($f_{band}$) based on indexing into at least one shuffled band frequency list using at least one band frequency start point and the channel index, wherein each element of the at least one band frequency list is an integer value from the set $\{0, 1, \ldots, N_{ch}-1\}$, and wherein each of the at least one band frequency start points is based on the pseudorandom keystream;
   generating a jitter value ($J_{value}$) based on indexing into at least one shuffled jitter value list using at least one jitter start point and the channel index, wherein each element of the at least one jitter value list is an integer value from the set $\{0, 1, \ldots, J_{range}-1\}$, wherein each of the at least one jitter start points is based on the pseudorandom keystream, and wherein $J_{range}$ is based on the minimum frequency separation constraint; and
   generating the hop frequency in accordance with a first equation:

$$f_{hop}=(f_{base}+\text{floor}(N_{freq}/N_{ch})\times f_{band}+J_{value}) \text{ modulo } N_{freq},$$

or in accordance with a second equation:

$$f_{hop}=(f_{base}+\text{floor}(N_{freq}\times f_{band}/N_{ch})+J_{value}) \text{ modulo } N_{freq}.$$

2. The method of claim 1, wherein generating the band frequency comprises indexing into a first shuffled band frequency list using a first band frequency start point and the channel index, wherein generating the jitter values comprises indexing into a first shuffled jitter value list using a first jitter start point and the channel index, and wherein a length of the first jitter value list is a multiple (M>1) of $J_{range}$.

3. The method of claim 1, wherein generating the band frequency comprises:
   generating a band frequency index based on indexing into a first shuffled band frequency list using a first band frequency start point and the channel index; and
   generating the band frequency based on indexing into a second shuffled band frequency list using the band frequency index, and
   wherein generating the jitter value comprises:
   generating a jitter index based on indexing into a first shuffled jitter value list using a first jitter start point and the channel index, wherein a length of the first jitter value list is a multiple (M>1) of $J_{range}$; and
   generating the jitter value based on indexing into a second shuffled jitter value list using a second jitter start point and the jitter index, wherein a length of the second jitter value list is $J_{range}$.

4. The method of claim 3, wherein the pseudorandom keystream comprises a first set of bits and a second set of bits, wherein generating the first jitter start point comprises transforming the first set of bits into an integer value between 0 and (M×$J_{range}$−1), and wherein generating the second jitter start point comprises transforming the second set of bits into an integer value between 0 and ($J_{range}$−1).

5. The method of claim 1, wherein the pseudorandom keystream is a bitstream generated by a cryptographic generator, and wherein the cryptographic generator is selected from the group consisting of Advanced Encryption Standard (AES), Data Encryption Standard (DES), Triple DES, International Data Encryption Algorithm (IDEA), Twofish, Serpent and Threefish.

6. The method of claim 1, wherein each of the at least one band frequency lists and each of the at least one jitter value lists is shuffled using a Fisher-Yates shuffling algorithm.

7. The method of claim 1, wherein the pseudorandom keystream comprises a first set of bits, and wherein generating the base frequency comprises transforming the first set of bits into an integer value between 0 and ($N_{freq}$−1).

8. The method of claim 1, wherein the number of a plurality of available frequencies is equal to the number of the plurality of channels, and wherein the jitter value is zero.

9. The method of claim 1, wherein the number of a plurality of available frequencies is greater than the number of the plurality of channels, and wherein the jitter value is greater than zero.

10. A system for generating a first plurality of hop frequencies ($f_{hop,1}, f_{hop,2}, \ldots, f_{hop,Nch}$) for each of a plurality of channels, the first plurality of hop frequencies being subject to a minimum frequency separation constraint (MBS), a number of the first plurality of hop frequencies being equal to a number of the plurality of channels ($N_{ch}$), each of the plurality of channels comprising a channel index, the system comprising:
  a plurality of available frequencies, wherein a number of the plurality of available frequencies is denoted $N_{freq}$;
  a bit generator configured to generate a pseudorandom keystream; and
  a frequency generator configured to generate a base frequency ($f_{base}$) based on the pseudorandom keystream, generate a band frequency ($f_{band}$) for each of the first plurality of hop frequencies based on indexing into at least one shuffled band frequency list using at least one band frequency start point and the channel index, and generate each of the first plurality of hop frequencies based on the base frequency, the band frequency, the minimum frequency separation constraint, and the number of the plurality of available frequencies.

11. The system of claim 10, wherein the first plurality of hop frequencies are generated at a first time, wherein the frequency generator is further configured to generate a second plurality of hop frequencies at a second time, and wherein the generation of each of the second plurality of hop frequencies comprises indexing into at least one differently shuffled band frequency list using the at least one band frequency start point and the channel index.

12. The system of claim 10, wherein the first plurality of hop frequencies are generated at a first time, wherein the frequency generator is further configured to generate a second plurality of hop frequencies at a second time, wherein the generation of each of the second plurality of hop frequencies comprises indexing into the at least one shuffled band frequency list using at least one different band frequency start point and the channel index, and wherein the at least one different band frequency start point is based on the pseudorandom keystream.

13. The system of claim 10, further comprising:
  a pseudorandom number generator configured to generate a jitter value ($J_{value}$) for each of the first plurality of hop frequencies from the set $\{0, 1, \ldots, J_{range}-1\}$, wherein $J_{range}$ is based on the minimum frequency separation constraint, wherein the frequency band is generated from the set $\{0, 1, \ldots, \text{Nch}-1\}$, and wherein generating each of the first plurality of hop frequencies is in accordance with a first equation:

$f_{hop,i}=(f_{base}+\text{floor}(N_{freq}/N_{ch}) \times f_{band,i}+J_{value,i}) \text{modulo } N_{freq}$, or in accordance with a second equation:

$f_{hop,i}=(f_{base}+\text{floor}(N_{freq} \times f_{band,i}/N_{ch})+J_{value,i}) \text{modulo } N_{freq}$.

14. The system of claim 13, wherein generating the jitter value for each of the first plurality of hop frequencies is based on indexing into at least one shuffled jitter value list using at least one jitter start point and the channel index.

15. The system of claim 13, wherein generating the jitter value for each of the first plurality of hop frequencies is based on the pseudorandom keystream.

16. The system of claim 13, wherein generating the band frequency for each of the first plurality of hop frequencies comprises indexing into a first shuffled band frequency list using a first band frequency start point and the channel index, wherein generating the jitter value for each of the first plurality of hop frequencies comprises indexing into a first shuffled jitter value list using a first jitter start point and the channel index, and wherein a length of the first jitter value list is a multiple (M>1) of $J_{range}$.

17. The system of claim 13, wherein generating the band frequency for each of the first plurality of hop frequencies comprises:
  generating a band frequency index based on indexing into a first shuffled band frequency list using a first band frequency start point and the channel index; and
  generating the band frequency based on indexing into a second shuffled band frequency list using the band frequency index, and
  wherein generating the jitter value for each of the first plurality of hop frequencies comprises:
  generating a jitter index based on indexing into a first shuffled jitter value list using a first jitter start point and the channel index; and
  generating the jitter value based on indexing into a second shuffled jitter value list using a second jitter start point and the jitter index.

18. The system of claim 10, wherein the number of the plurality of available frequencies is less than a product of the number of the plurality of channels and the minimum frequency separation constraint, wherein the plurality of channels are grouped into a plurality of subsets, wherein a product of a number of channels in each of the plurality of subsets and the minimum frequency separation constraint is less than or equal to the number of the plurality of available frequencies, and wherein the frequency generator is further configured to generate a plurality of base frequencies for each of the plurality of subsets.

19. The system of claim 10, wherein a number of frequency bands ($N_{bands}$) is a quotient from dividing the number of the plurality of available frequencies by the minimum frequency band separation, wherein the frequency band is generated from the set $\{0, 1, \ldots, N_{bands}-1\}$, and wherein generating each of the first plurality of hop frequencies is in accordance with the equation:

$f_{hop,i}=(f_{base}+f_{band,i} \times \text{MBS}) \text{modulo } N_{freq}$.

20. A non-transitory tangible computer-readable medium embodying program code executable by a computing system, the program code for generating a plurality of hop frequencies for each of a plurality of channels, the plurality of hop frequencies being subject to a minimum frequency separation constraint, a number of a plurality of available frequencies being based on a product of a number of the plurality of hop frequencies and the minimum frequency separation constraint, each of the plurality of channels comprising a channel index, the program code comprising:
  program code for receiving a pseudorandom keystream;
  program code for generating a base frequency based on the pseudorandom keystream;
  program code for generating a band frequency based on indexing into at least one shuffled band frequency list using at least one band frequency start point and the channel index; and
  program code for generating each of the plurality of hop frequencies based on the base frequency, the band frequency, the minimum frequency separation constraint, and the number of the plurality of available frequencies.

* * * * *